W. LEWIN.
CASING TONGS.
APPLICATION FILED FEB. 14, 1911.
1,008,654.
Patented Nov. 14, 1911.
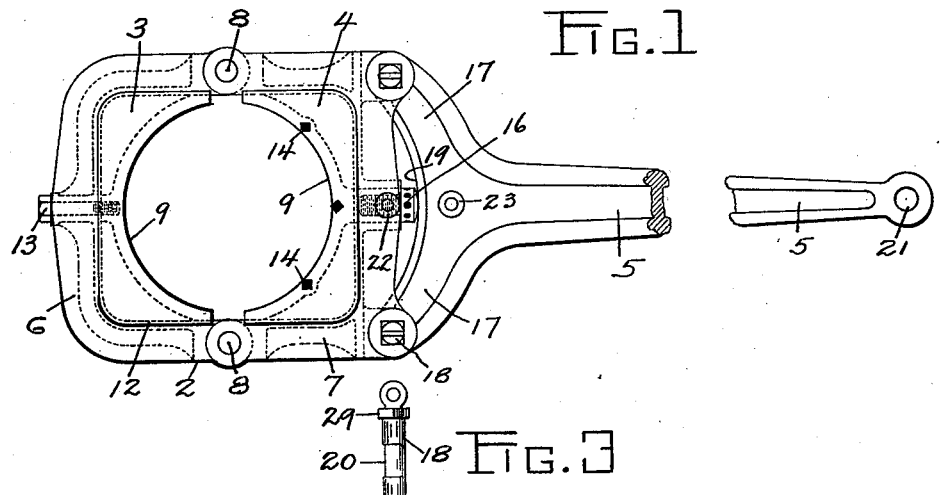
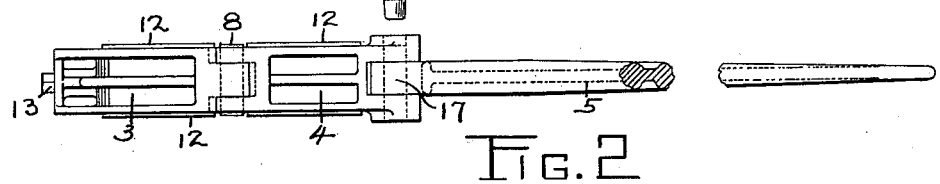
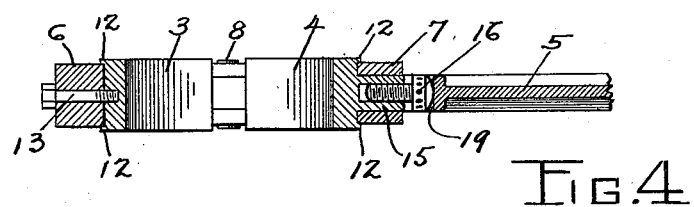
WITNESSES:
INVENTOR.
WALTER LEWIN
BY Miller & White
ATTORNEYS.

UNITED STATES PATENT OFFICE.

WALTER LEWIN, OF COALINGA, CALIFORNIA.

CASING-TONGS.

1,008,654. Specification of Letters Patent. Patented Nov. 14, 1911.

Application filed February 14, 1911. Serial No. 608,519.

*To all whom it may concern:*

Be it known that I, WALTER LEWIN, a subject of Great Britain, and a resident of Coalinga, county of Fresno, and State of California, have invented certain new and useful Improvements in Casing-Tongs, of which the following is a specification.

The invention relates to casing tongs which are used in screwing together lengths of pipe or casing such as is used in water or oil wells.

In the drilling of wells, the hole is cased off with a casing which is lowered into the well, as the drilling tool cuts deeper. The casing comes in lengths or sections, and as the string of casing in the well is lowered another section is screwed on to the top. The string of casing in the well is held stationary by suitable clamping means, and the section to be added is revolved to screw it to a seat in the coupling on the end of the string. The casing used in oil wells is generally heavy and of a comparatively large diameter, and much energy is required to properly screw the two lengths together. A wrench, or tongs having a long handle, is used, the end of the handle being generally connected by a rope or other flexible means to a power driven crank arm. The handle of the wrench is swung backward by hand, and is pulled forward, screwing the casing together by means of the jerk line. The circumstances of operation are such that the angle through which the wrench is moved at each jerk is approximately 60°. It is evident, therefore, that the wrench or tongs should be constructed to grip the casing at the beginning of the forward or screwing stroke so that the casing will be turned through as large an angle as possible. In certain circumstances it is advisable to vary the shifting of the clamping means as tongs move in the operative or inoperative direction so that the pull on the casing when the tongs move in the backward or inoperative direction will not be sufficient to turn the casing in that direction.

The object of the present invention is to provide casing tongs which have the property of clamping the casing securely at the beginning of the forward movement of the tongs.

Another object of the invention is to provide casing tongs which operate to grip the casing for a slight movement of the handle of the tongs in the forward direction.

A further object of the invention is to provide casing tongs which may be readily adjustable to fit any size of casing and in which the amount of movement of the gripping or clamping jaws may be varied.

With these and other objects in view, as will more fully hereinafter appear, the invention consists of certain novel features of construction and arrangement of parts, hereinafter fully described, illustrated in the accompanying drawings and particularly pointed out in the appended claims, it being understood that various changes in the form, proportions, size and minor details of the structure may be made without departing from the spirit or sacrificing any of the advantages of the invention.

Referring to the drawings: Figure 1 is a plan or top view of the tongs, part of the handle being broken away to reduce the size of the figure. Fig. 2 is a side view of the tongs similar to Fig. 1. Fig. 3 is a detail of the bolt by which one lug on the handle is secured to the frame. Fig. 4 is a section taken through the tongs and part of the handle on the center line.

The tongs consists principally of the frame 2 carrying the clamping blocks 3—4 and the handle 5 having a bifurcated end which is attached to opposite sides of the frame 2 at one end. The frame consists of two members 6—7 which are fastened together by the pins 8 to form a comparatively rigid structure. The pins 8 are removable so that the members 6—7 may be swung apart to remove the clamping blocks 3—4 when desirable. The clamping blocks 3—4 are formed with circular inner faces 9, of a radius corresponding to the radius of the casing. The tongs can be adjusted to operate different sized casings, by removing the clamping blocks and substituting other blocks having a radius of curvature corresponding to the size of the casing to be screwed.

The clamping blocks 3—4 are provided with flanges 12 around the edges, which overlie the edge of the frame 2 and hold the blocks from being vertically displaced. Clamping block 3 is held to a seat in the frame by means of the screw 13 which passes through the frame and engages the block. Bars 14 of some tough material, such as tool steel, may be inserted in the clamping blocks, with the edges projecting slightly beyond the faces of the blocks, to assist in gripping the casing.

The clamping block 4 is provided on the rear end with a boss 15 which projects into a hole or opening in the member 7. The boss 15 is provided with a screw threaded socket to take the screw 16, the head of which lies external to the frame in close relation to the handle 5. The clamping block 4 is slidable in the frame 2, so that the head of the screw 16 lies more or less external to the frame depending on the position of the clamping block.

The handle 5 is provided with a bifurcated end, formed of the two lugs 17 which are attached to the frame 2 by pins passing through the frame and the lugs. The inner face 19 of the handle, lying between the lugs, is preferably formed on a smooth curve and so arranged that in the operation of the tongs it contacts intermittently with the head of the screw 16.

One of the pins 18 which connects the handle to the frame is formed eccentric or recessed at that part 20 which contacts with the handle when in place. This allows the handle to be moved slightly about the other pin without moving the frame and thereby varies the distance between the head of the screw 16 and the inner face of the handle. The pin 18 is provided with a square head 29 which fits in a depression in the frame 2 and holds the pin from turning. When it is desired to vary the play of the handle on this pin, it may be partly removed, turned through a 90° angle and again dropped into position. This causes the handle to engage a part of the pin having a different eccentricity thereby varying the play. The pin 18 may be placed at either of the connections between the handle and the frame depending upon the direction in which it is desired to screw. The outer end of the handle is provided with a ring 21 to take the jerk line or other connection. As a means of securing a holding or lifting means for transporting the tongs, I provide the rings 22—23 on the frame and handle respectively.

The operation of the device is as follows: I will assume that the tongs are in place on the casing, and that the casing is screwed when the handle is moved forward (Fig. 1). Under these conditions, the pin 18 will connect the forward lug of the handle with the frame. The screw 16 is adjusted so that when the handle is pulled forward the clamping blocks securely clamp the casing. As the handle is moved backward, the play about the pin 18 allows the inner face of the handle to move away from the head of the screw 16, and the clamping block 4 is moved away from the casing so that the tongs are free to turn. At the beginning of the forward stroke the movement of the handle causes the inner face 19 to press against the head of the screw 16, forcing the clamping block 4 into engagement with the casing. The first slight movement of the handle, therefore, operates to clamp the casing, and the further movement of the handle turns the casing, screwing it into the coupling. The screw 16 is adjustable so that the pressure on the casing may be varied according to circumstances.

I claim:

1. Casing tongs, comprising a frame, clamping blocks removably fixed in said frame, one of said blocks being slidable, a handle having a bifurcated end attached to the frame at opposite corners, the connection between the handle and the frame being such that the handle is capable of slight movement independent of the movement of the frame and a projection on the slidable block adapted to contact with said handle.

2. Casing tongs comprising a frame, a handle connected to the frame at two points spaced apart, clamping blocks held in said frame, one of said clamping blocks being slidable and arranged to engage the handle between the two points of connection to the frame, one of said connections between the handle and the frame being loose.

3. Casing tongs comprising a frame, removable clamping blocks in said frame, one of said clamping blocks being slidable longitudinally of said frame, an adjustable screw in said slidable clamping block extending through said frame, a handle having a bifurcated end attached to said frame on opposite sides of said screw, the connections between the handle and frame being loose, so that the handle has a limited movement independent of the frame, the screw being adjusted so that it contacts with the handle between the connections.

4. Casing tongs comprising a frame, removable clamping blocks in said frame, one of said clamping blocks being slidable longitudinally of said frame, an adjustable screw in said slidable clamping block extending through said frame and adapted to contact with the handle, a handle attached to said frame so as to have a slight movement independent of said frame and means for varying the extent of such movement.

5. Casing tongs comprising a frame, clamping blocks in said frame, one of said clamping blocks being slidable longitudinally thereof, a screw in said slidable clamping block extending to a point external of said frame and adapted to contact with the handle, a handle having a bifurcated end attached to said frame on opposite sides of said screw, one of the connections between the frame and handle comprising a pin having an eccentric portion adapted to contact with the lug on the handle, said pin being adapted to be adjusted to vary the amount of play between the handle and the frame.

WALTER LEWIN.

Witnesses:
  A. F. WEBER,
  H. H. FRASER.